United States Patent Office 3,420,346
Patented Jan. 7, 1969

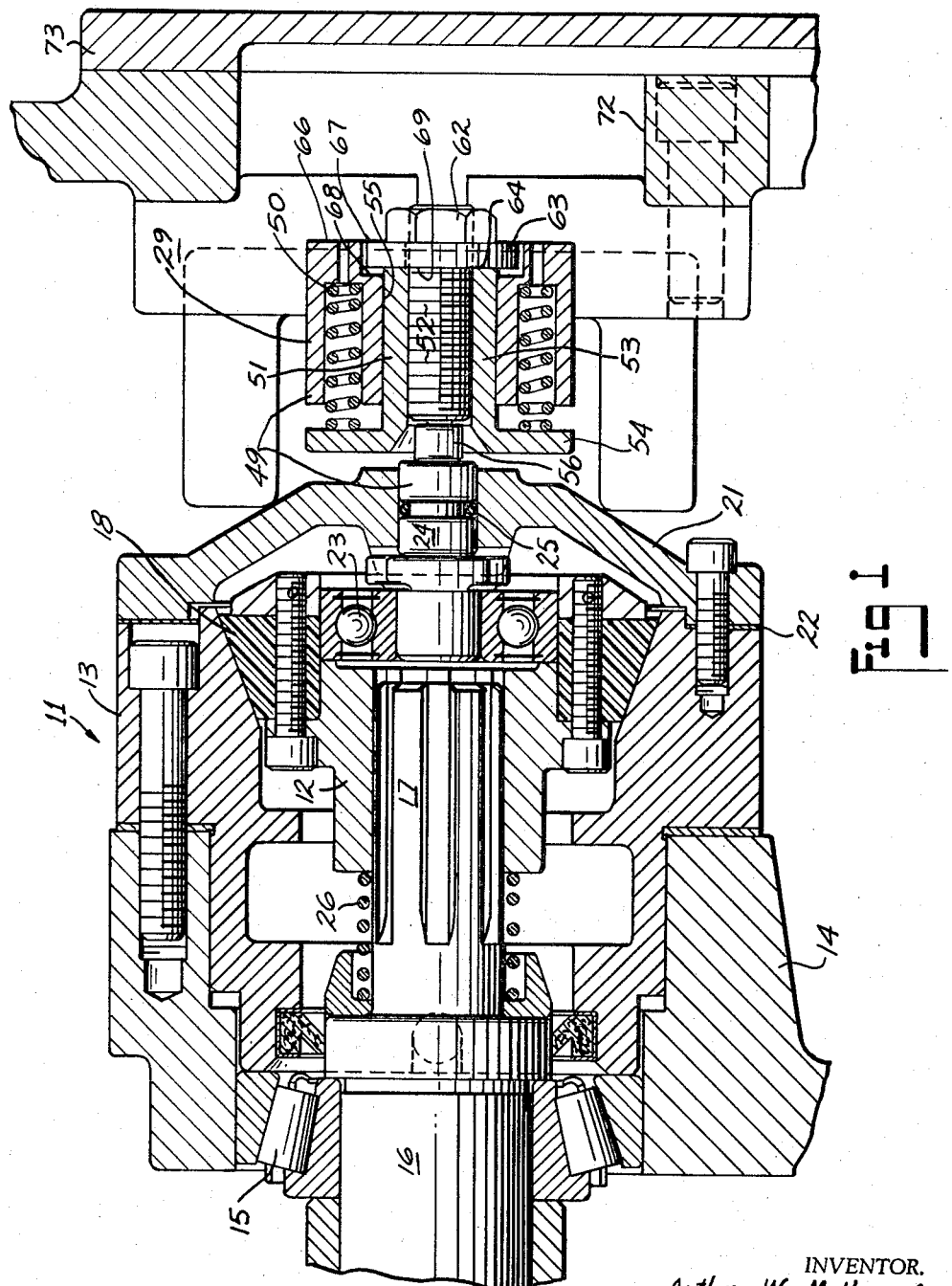

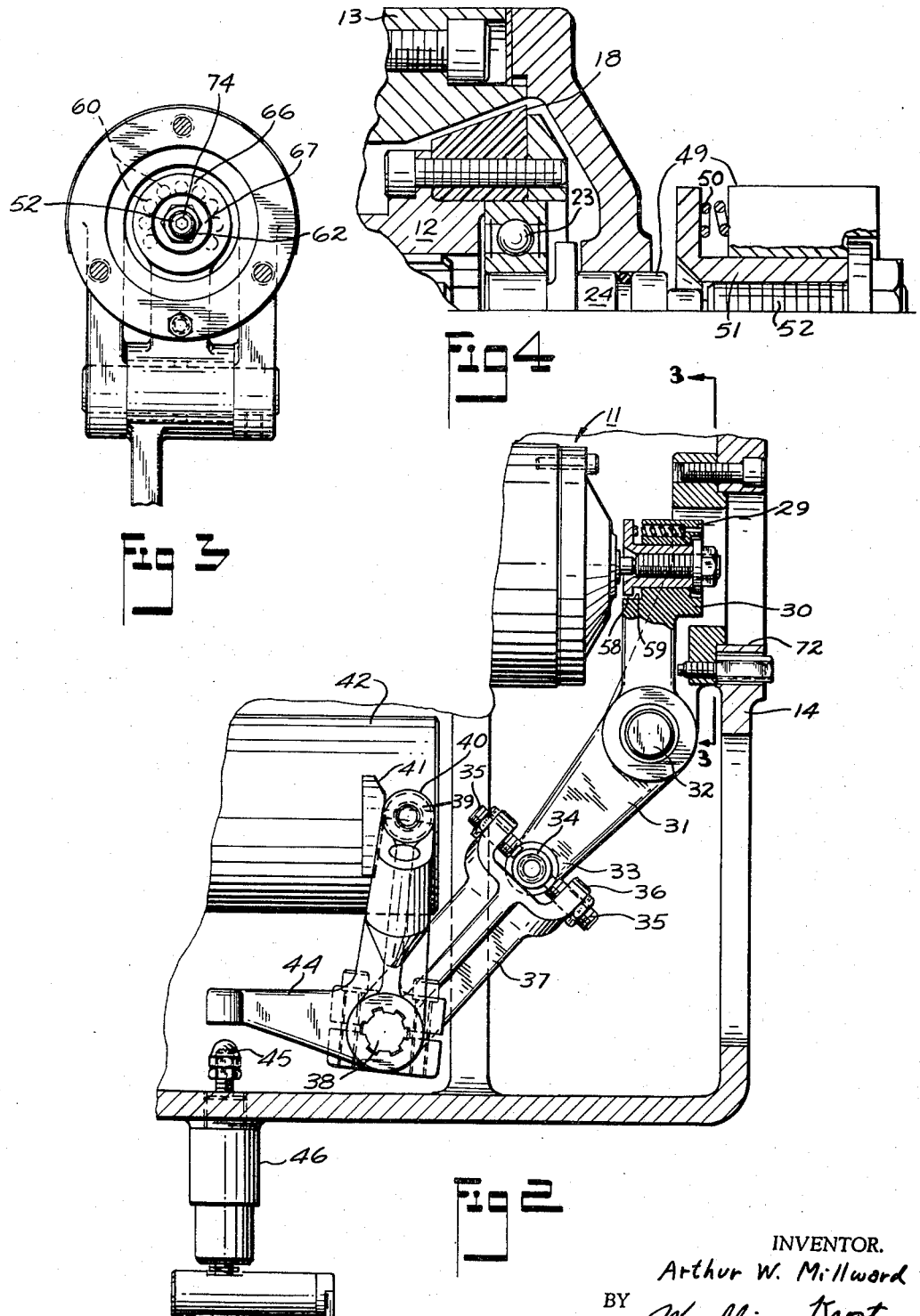

3,420,346
FRICTION MECHANISM ADJUSTMENT
WITH WEAR INDICATOR
Arthur W. Millward, Cleveland, Ohio, assignor to The
National Acme Company, a corporation of Ohio
Filed Dec. 27, 1966, Ser. No. 604,917
U.S. Cl. 192—111          15 Claims
Int. Cl. F16d *13/60*

ABSTRACT OF THE DISCLOSURE

The invention relates in general to adjustment of friction mechanisms such as a brake or clutch and more particularly to the easy and precise adjustment of such a friction mechanism to compensate for wear.

The invention is shown as applied to a cone brake moved by a lever as an actuator and through linkage means. The brake may be cycled on and off thousands of times per hour as in a machine tool for example and wear inevitably results. The brake is spring applied and cam released with the spring a part of the linkage means. As wear occurs this lessens the spring force and lessens the torque absorbed by the brake. Accordingly, two gauging surfaces are incorporated in the linkage means in series with the spring and as wear occurs these two gauging surfaces or indicia become misaligned. First and second threaded parts are also included in the linkage means to be readily adjusted to permit the gauging surfaces to be easily returned to alignment to restore the brake to its desired amount of torque absorption.

SUMMARY OF THE INVENTION

The invention may be incorporated in a clutch or brake friction mechanism including first and second cooperable and relatively rotatable members, said first member being movable generally axially to engage said second member, the improvement comprising, an actuator movable between first and second positions, linkage means connected to move said first member in accordance with movement of said actuator, said linkage means including spring means acting between said actuator and said first member to be stressed to a greater degree upon said actuator moving from a first to a second position to move said first member in a first axial direction to cause engagement between said first and second members of said friction mechanism, a first gauging surface moved directly in accordance with said actuator, a second gauging surface moved directly in accordance with said first member, said friction mechanism being subject to wear so that said first member needs to move further in said first axial direction for frictional engagement with said second member of said friction mechanism and wear thus causing misalignment of said first and second gauging surfaces, first and second interthreaded parts in said linkage means, and relative rotation of said first and second parts on said threads relatively axially adjusting said linkage means to permit said first and second gauging surfaces to be reestablished in alignment with each other to compensate for wear on said friction mechanism.

In many prior art brake or clutch friction mechanisms there have been problems due to wear on one or both of the members of the friction mechanism. This is particularly true where one of the members is softer than the other in order to achieve smooth and even transfer of clutch or brake torque. Hard materials for both members of the friction mechanism permits the unit to wear longer before it gets out of adjustment but often such materials will score or bind to prevent smooth clutch or brake action. Accordingly, somewhat softer materials are favored for at least one of the members and these have accelerated wear problems especially in machine tools which cycle rapidly and use the clutch or brake frequently, for example, in the order of ½ second of friction mechanism engagement during each cycle of operation which may be in the order of one to two seconds. Also where the friction mechanism is a conical mechanism, then any increment of wear increases the axial movement of the friction member in the order of four to five times. With the machine tool cycling every one and one-half seconds, this is forty brake applications per minute or 2,400 per hour and even though the wear on the friction mechanism is a very small amount per application, this wear will be considerable in a week's time.

Accordingly, it is an object of the invention to provide a friction mechanism wherein rapid, easy and precise adjustment of the friction mechanism is possible.

Another object of the invention is to provide a friction mechanism wherein adjustment thereof is facilitated from one end.

Another object of the invention is to provide a friction mechanism with first and second gauging surfaces which by misalignment show the wear on the friction mechanism and which may be easily realigned visually upon the friction mechanism being adjusted to compensate for wear.

Another object of the invention is to provide first and second planar gauging surfaces closely spaced which will readily indicate by their misalignment when the clutch needs adjustment to compensate for wear.

Another object of the invention is to provide a friction mechanism which is spring urged into engagement and threaded parts are in series with the spring to compensate for wear in the friction mechanism and to permit the spring to be reestablished at its former predetermined length.

Other objects and a fuller understanding of the invention may be had by referring to the following description and claims, taken in conjunction with the accompanying drawing, in which;

FIGURE 1 is a longitudinal sectional view of a friction mechanism embodying the invention;

FIGURE 2 is an elevational view partly in section showing more of the machine;

FIGURE 3 is a partial view on line 3—3 of FIGURE 2; and

FIGURE 4 is a partial view similar to FIGURE 1 but with the friction mechanism disengaged.

The figures of the drawing show a friction mechanism 11 of a preferred embodiment of the invention. This friction mechanism 11 includes first and second relatively rotatable members 12 and 13 and may be incorporated in a brake or a clutch. The figures of the drawing show the invention incorporated in a brake with the first member 12 being rotatable and the second member 13 being stationary as fixed to a frame 14. The frame 14 may be that of a machine tool, for example, having a bearing 15 journalling a shaft 16. The first member 12 is splined at 17 to be slidable on and rotate with the shaft 16. This first member 12 has friction material 18 with an exterior conical surface thereon for frictional engagement with a complementary internal conical surface on the second member 13. This friction material 18 may be non-metallic or metallic and is preferably a phenolic material such as is customarily used in brake or clutch facings.

A cover 21 is fixed on the frame 14 and sealed thereto by a gasket 22 to prevent entry of oil and the like into the friction mechanism 11. A thrust bearing 23 is disposed between the first member 12 and a plunger 24 which is cylindrical and disposed in a coaxial aperture in the cover 21. An O-ring 25 seals entry of foreign matter into the interior of the friction mechanism 11. A light coaxial compression spring 26 acts between the first and second members 12 and 13 urging the first member 12 toward frictional disengagement from the second member 13.

An actuator 29 is provided to move the first member 12 between engaged and released positions relative to the second member 13. In this preferred embodiment the actuator 29 is the first end 30 of a first lever 31. This first lever 31 is journalled at an intermediate point on a bearing 32 carried in the frame 14. The lever 31 has a second end 33 carrying a roller 34. This roller is acted on by screws 35 carried in a yoke end 36 of a second lever 37. The lever 37 is fixed on a shaft 38 which is journalled in the frame 14. A second end 39 of the second lever 37 carries a cam follower 40 cooperating with a cam 41 on a cam drum 42. This cam drum 42 may be a part of the machine tool with which the friction mechanism 11 is used to power various parts of the machine tool and also to cycle the friction mechanism 11 between engaged and disengaged positions. An extension arm 44 is fixed on the second lever 37. This arm may be actuated by the plunger 45 of a fluid cylinder 46 for momentary or sustained actuation of the friction mechanism 11. This is permitted because the cam 41 acts on only one side of the cam follower 40 with cooperation therebetween assured by the compression spring 26.

The actuator 29 is connected to the first member 12 by linkage means 49. Broadly this linkage means includes spring means 50 and first and second interthreaded parts 51 and 52, respectively. The linkage means 49 also includes the plunger 24 and the thrust bearing 23. The first threaded part 51 is in the shape of a headed bushing having a body portion 53 and a head 54. The first and second threaded parts 51 and 52 are generally coaxial with the friction mechanism 11 although not precisely because the body 53 slides longitudinally in an aperture 55 in the actuator 29, which is a part of the lever 31 pivoted on the frame 14. The aperture 55 is generally cylindrical to guide the body 53. However, the head 54 has a flat 58 cooperating with a ledge 59 on the actuator 29 to prevent the first threaded part 51 from turning relative to actuator 29.

The threaded pin 52 has a swivel head 56 to bear against the outer end of the plunger 24 and to maintain engagement therewith despite slight pivotal movements of the lever 31.

The second threaded part 52 is a threaded coaxial pin threaded into a tapped hole in the body 53. As best shown in FIGURES 1 and 3, there are a plurality of spring pockets 60 in the actuator 29 into which one or more coil compression springs may be inserted to constitute the spring means 50. These spring means thus relatively urge apart the head 54 and the actuator 29. A lock nut 62 is threaded on the outer end of the threaded pin 52 and a thrust washer 63 is disposed between the lock nut 62 and the outer end 64 of the body 53. A first gauging surface 66 is disposed on the outer end of the actuator 29 and a second gauging surface 67 is disposed on the outer end of the thrust washer 63. A recessed shoulder 68 is provided near the outer end of actuator 29 and spaced from the opposite surface 69 of the thrust washer 63 when the friction mechanism 11 is engaged as in FIGURES 1 and 2. This opposite surface 69 is engaged with the recessed shoulder 68 as shown in FIGURE 4 when the friction mechanism 11 is disengaged. An access hole 72 is provided in the frame 14 and covered by a cover plate 73. Removal of the cover 73 permits access to the lock nut 62, threaded pin 52 and the gauging surfaces 66 and 67. The outer end of the threaded pin 52 may be provided with a non-circular polygonal tool pad 74. This is shown as a hexagonal hole to receive an Allen type wrench.

OPERATION

The friction mechanism 11 is illustrated as being a brake and it has the first member 12 rotatable relative to the second member 13 and frictionally cooperable therewith. This frictional cooperation is achieved by axial movement of the first member 12 by means of generally axial movement of the actuator 29.

FIGURE 4 is a partial view illustrating the brake in the disengaged position as urged by the light spring 26. The separation between the first and second members 12 and 13 is exaggerated in FIGURE 4 for clarity. The rotation of the cam drum 42 to the position shown in FIGURE 1 will pivot lever 37 clockwise and will pivot lever 31 counterclockwise, as viewed in FIGURE 1, to move the actuator 29 to the left from the first position of FIGURE 4 to the second position of FIGURE 1. The spring means 50 are considerably stiffer than the light spring 26. Accordingly, leftward movement of the actuator 29 will move the first threaded part 51 directly and through the linkage means 49 will move the first member 12 to the left, compressing the spring 26. The final increment of movement of the actuator 29 will compress the spring means 50, assuring frictional engagement of a definite amount between the first and second members 12 and 13. This will separate the recessed shoulder 68 from the surface 69 of the thrust washer 63 and result in the relative positions shown in FIGURE 1. From one to nine coil compression springs 50 may be inserted into the spring pockets 60 in order to achieve the desired amount of foot pounds of torque between the first and second members 12 and 13. In one practical embodiment, five such springs 50 were utilized resulting in about thirty foot pounds of torque. The free length of the springs 50 exceeds the compressed length of FIGURE 4 and they are compressed to a slightly greater extent in FIGURE 1. Because the springs 50 actually compressed only slightly and because the length thereof does not change very much during actuation of the friction mechanism 11, the springs 50 are never stressed beyond their elastic limit and thus the force thereof remains constant throughout the life of the mechanism. Because the springs 50 are used, the fiction mechanism 11 is engaged by a spring force of substantially constant amount during life of the mechanism rather than being directly engaged by the cam 41. In one practical embodiment the brake 11 was engaged for only about one-tenth second during every cycle of about one and one-half seconds in order to rapidly brake the shaft 16 from a high speed to a low speed. This means that the brake 11 was actuated approximately 2,400 times per hour. With the conical friction material 18, this material resists wear but these many applications per hour will necessarily result in some wear which is primarily on the first member 12. Also the fact that the members 12 and 13 are conical means that for every 0.001 of an inch of wear, there is required about 0.003 of an inch of additional axial movement to the left of the first member 12 to engage this brake. If the first member 12 wears sufficiently so that it must move to the left an additional 0.060 of an inch, then the springs 50 would be extended by this same amount because the first threaded part 51 would be moved to the left by this amount during actuation of the brake. This would be when the actuator 29 has moved to the left from the first position of FIGURE 4 to the second position of FIGURE 1. Accordingly under these circumstances the clearance between the recessed shoulder 68 and the surface 69 of thrust washer 63 would nearly disappear.

The cover 73 may be removed to permit inspection of the gauging surfaces 66 and 67. With the brake engaged in the position of FIGURE 1, if these gauging surfaces are not in planar alignment, then this indicates the brake is not properly adjusted. For example, wear will cause the thrust washer gauging surface 67 to be depressed below the first gauging surface 66. Wear adjustment is readily accomplished by loosening the lock nut 62 and using an Allen type wrench to turn the threaded pin 52 clockwise. This will move the pin 52 to the left relative to body 53 as viewed in FIGURE 1. With the brake engaged, this pin actually does not move longitudinally, instead, the threaded part 51 will move to the right to bring the second gauging surface 67 into alignment with the first gauging surface 66. The lock nut 62 may then be tightened and the cover 73 replaced.

The actuator 29 moves the same distance from the first position to the second position during each actuation by the cam 41. Wear on the friction mechanism 11 means that the first member 12 moves further to the left because of this wear, and accordingly the first threaded part 51 will also move further to the left during brake application. As a result, the springs 50 become increasingly extended as the wear progresses. Because the force on the first member 12, and the foot-pounds of torque developed by this brake is dependent upon the stress in the springs 50, and the force developed by the springs is directly proportional to the amount of compression thereof, this force and the foot-pounds of torque will decrease as wear increases. Such wear is easily ascertained by viewing the gauging surfaces 66 and 67 because they will be increasingly misaligned. Adjustment of the threaded pin 52 to bring the gauging surfaces again into alignment, will compress the springs 50 to their former calibrated position and thus reestablish the foot-pounds of torque of the brake at the desired level.

The springs 50 are in series with the first and second threaded parts 51 and 52 in the linkage means 49 which joins the actuator 29 to the first member 12. Also relative rotation of the first and second threaded parts 51 and 52 will relatively axially adjust the linkage means to permit the first and second gauging surfaces 66 and 67 to be reestablished in alignment with each other to compensate for wear on the friction mechanism 11. This relative rotation of the parts 51 and 52 on the threads adjusts the axial distance between the actuator 29 and the first member 12 with the brake disengaged. Also this relative rotation of parts 51 and 52 simultaneously adjusts the axial distance between the two ends of the springs 50. The first threaded part 51, and especially the head 54 thereof, may be considered a reaction member in the linkage means 29 which absorbs the force from the springs 50 and transmits such force to the first member 12. The first threaded part 51 may be considered a headed bushing with the body 53 being the main part of the bushing and having the head 54. The fact that the first and second gauging surfaces 66 and 67 are planar surfaces and are disposed closely adjacent in a radial direction, permits these two surfaces to be readily observed to determine if they are in alignment.

The recessed shoulder 68, engaging the opposite surface 69 of the thrust washer 63, as shown in FIGURE 4 means that the first threaded part 51, the second threaded part 52 and the actuator 29 move together generally as a unit to the brake disengaged position of FIGURE 4, as urged by the weak spring 26. This is permitted because the cam 41 cooperates with the cam follower 40 on only one side thereof and is held thereagainst by this weak spring 26. Such construction also permits the levers 31 and 37 to be moved by the fluid cylinder 46 where such is desired and necessary for machine tool operations or set-up operations. The spacing between the recessed shoulder 68 and the opposite surface 69 of thrust washer 63 is less than the travel of actuator 29 between the first and second positions. This maintains the springs 50 under compression so that they are ready to act to transmit a force to the first member 12 upon the friction mechanism 11 being engaged.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. In a clutch or brake friction mechanism including first and second cooperable and relatively rotable members:
   said first member being movable generally axially to engage said member,
   the improvement comprising, an actuator movable between first and second positions,
   linkage means connected to move said first member in accordance with movement of said actuator,
   said linkage means including spring means acting between said actuator and first member to be stressed to a greater degree upon said actuator moving from a first to a second position to move said first member in a first axial direction to cause engagement between said first and second members of said friction mechanism,
   a first gauging surface moved directly in accordance with said actuator,
   a second gauging surface moved directly in accordance with said first member,
   said first and second gauging surfaces being adjacent each other and lying substantially in the same radial plane when the relatively rotable members are engaged,
   said friction mechanism being subject to wear so that said first member needs to move further in said first axial direction for frictional engagement with said second member of said friction mechanism and wear thus causing misalignment of said first and second gauging surfaces,
   first and second interthreaded parts in said linkage means,
   and relative rotation of said first and second parts on said threads relatively axially adjusting said linkage means to permit said first and second gauging surfaces to be reestablished in alignment with each other to compensate for wear on said friction mechanism.

2. A friction mechanism as set forth in claim 1 wherein said threaded means and said spring means are connected in series in said linkage means.

3. A friction mechanism as set forth in claim 1 wherein relative rotation of said first and second parts on said threads adjusts the axial distance between said actuator and said first member.

4. A friction mechanism as set forth in claim 1 including first and second ends on said spring means:
   and wherein relative rotation of said first and second parts on said threads adjusts the axial distance between said first and second ends of said spring means.

5. A friction mechanism as set forth in claim 4 wherein relative rotation of said first and second parts on said threads also simultaneously adjusts the axial distance between said actuator and said first member.

6. A friction mechanism as set forth in claim 1 wherein said first and second gauging surfaces are substantially planar surfaces:
   said first gauging surface being disposed on said actuator on the end remote from said first member to be visible primarily from said end.

7. A friction mechanism as set forth in claim 1 wherein said first and second interthreaded parts include a reaction member:
   said second gauging surface being a surface moved directly with said reaction member and being at the end thereof remote from said first member to be visible primarily from said end.

8. A friction mechanism as set forth in claim 1 wherein said first and second interthreaded parts include a reaction member threaded on a coaxial pin acting on said first member.

9. A friction mechanism as set forth in claim 8 including a non-circular tool pad on said coaxial pin to permit turning said pin for adjustment:
   said tool pad being on the end of said pin remote from said first member to permit tool access thereto from said end.

10. A friction mechanism as set forth in claim 8 including a headed bushing with the head thereof being said reaction member and engaged by said spring means.

11. A friction mechanism as set forth in claim 10 wherein said coaxial threaded pin carries a lock nut on the end thereof remote from said first member:

and a thrust washer interposed between said lock nut and the body of said bushing.

12. A friction mechanism as set forth in claim 11 wherein said first gauging surface is on one end of said actuator remote from said first member:

said second gauging surface is a planar surface on said thrust washer and adapted to lie in the same plane as said first gauging surface with said friction member properly adjusted for wear and with said first and second members of said friction means in engagement.

13. A friction mechanism as set forth in claim 12 including a release spring acting to separate said first and second members of said friction mechanism:

and a recessed shoulder in said actuator adapted to engage the opposite surface of said thrust washer upon said actuator being moved to said first position and said release spring moving said first member away from said second member.

14. A friction mechanism as set forth in claim 13 wherein the spacing between said recessed shoulder and said opposite surface of said thrust washer with said friction mechanism in the engaged position is less than the movement of said actuator between said first and second positions.

15. A friction mechanism as set forth in claim 1 wherein said friction mechanism is a brake:

said second member being stationary, and said first member being conical to engage a complementary conical surface on said second member.

References Cited

UNITED STATES PATENTS

| | | | |
|---|---|---|---|
| 888,523 | 5/1908 | Moore | 192—109 X |
| 2,244,169 | 6/1941 | Miller | 192—109 X |
| 2,776,031 | 1/1957 | Turnquist et al. | 192—111 X |
| 3,331,482 | 7/1967 | Keramas | 192—109 X |

BENJAMIN W. WYCHE, *Primary Examiner.*

U.S. Cl. X.R.

192—109; 188—196